United States Patent [19]

Gould, Jr.

[11] 3,775,591

[45] Nov. 27, 1973

[54] OVEN HEATER ELEMENT CONTROL CIRCUIT

[75] Inventor: Robert R. Gould, Jr., Dayton, Ohio

[73] Assignee: General Motors Corporation, Detroit, Mich.

[22] Filed: Dec. 26, 1972

[21] Appl. No.: 318,012

[52] U.S. Cl. ............................... 219/501, 307/252
[51] Int. Cl. ............................................. H05b 1/02
[58] Field of Search................ 219/494, 501, 497, 219/505; 323/1 SW, 2 S, 24; 307/252

[56] References Cited
UNITED STATES PATENTS

| | | | |
|---|---|---|---|
| 3,484,623 | 12/1969 | Cain............................... | 323/24 UX |
| 3,646,577 | 2/1972 | Ernst.................................. | 219/501 |
| 3,512,077 | 5/1970 | Evalds............................. | 219/494 X |
| 3,546,435 | 12/1970 | Welch................................. | 219/501 |
| 3,729,651 | 4/1973 | Fricker et al...................... | 323/24 X |

Primary Examiner—Bernard A. Gilheany
Assistant Examiner—F. E. Bell
Attorney—Eugene W. Christen et al.

[57] ABSTRACT

A switching circuit for a heating element including a power triac in series with the heater element between one line of an alternating current source and neutral. The power triac is controlled from a pilot triac connected in series with an RC network between the control electrode of the power triac and neutral. The pilot triac is triggered a short time interval after the zero crossing of the AC source and the capacitor is alternately charged in opposite directions with the charge accumulation of the capacitor being utilized to trigger the power triac.

2 Claims, 3 Drawing Figures

OVEN HEATER ELEMENT CONTROL CIRCUIT

This invention relates to synchronous switching circuits for controlling bidirectional semiconductor switches and more particularly to a neutral referenced trigger circuit for controlling bidirectional semiconductor switches which control current flow to an oven resistive heating element connected between the lines of the standard domestic power supply.

Semiconductor switches such as the triac have been proposed in recent years to control the supply of alternating current power to the resistive heating elements of a domestic range. The triac normally exhibits a high impedance characteristic between two main current carrying terminals but may be switched to a low impedance state by the application of a triggering impulse to its gate terminal. By triggering the triac at the zero crossover point of the AC power supply, continuous AC power may be applied to the load with minimum radio frequency interference. Accordingly, the trigger circuits for the triac usually include a zero crossover switch cooperating with a temperature sensing circuit for firing the triac at the zero crossover point whenever the oven temperature is below a preselected temperature. Control circuits of this nature are disclosed in the U.S. Pat. Nos. 3,546,435 to Welch, and 3,665,159 to Decker et al. Where the control circuit is referenced to the neutral line of the domestic supply and the load is connected line-to-line, transformers are necessary to provide effective electrical isolation of the control circuit from the high voltage power supply or current limiting resistors must be connected in the gate circuit of the triac in order to limit the current flow through the triac gate. Transformers are bulky and expensive and the use of current limiting resistors results in the dissipation of considerable amounts of power.

With the foregoing in mind it is an object of the present invention to provide an improved control circuit for triggering a bidirectional semiconductor switch providing transformerless isolation and reduced power dissipation.

In accordance with the present invention a power triac connected in series with the oven heating element across the power supply has its gate terminal connected to the neutral line of the power supply through a series network including a resistor, a capacitor, and a pilot triac. The gate of the pilot triac is connected with control circuitry producing a series of trigger pulses synchronized with the zero crossover voltage point of the line-to-neutral voltage whenever the temperature of the oven is below the preselected temperature. The capacitor is alternately charged in opposite directions as the pilot triac is successively triggered. The charge accumulation on the capacitor is utilized to trigger the power triac at the subsequent zero crossover voltage point to provide full wave current to the load.

Other objects and advantages of the present invention may be had from the following detailed description which should be taken in conjunction with the drawings in which.

Figure 1:
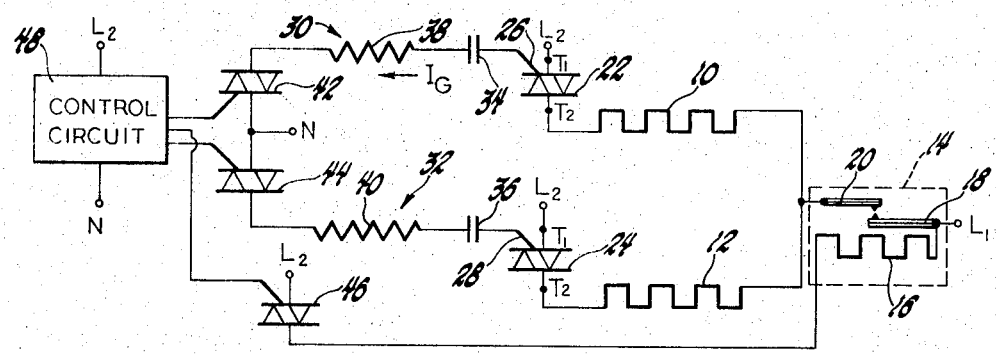
FIG. 1 is a schematic diagram partially in block diagram showing the power triac firing circuit of the present invention.

Referring now to the drawings and initially to FIG. 1, the numerals 10 and 12 designate electrical resistance heating elements such as the Broil and Bake heating elements respectively of an oven.

Current is supplied to the elements 10 and 12 from the standard three wire domestic power supply nominally of 240 volt 60 cycle alternating current. The domestic supply has a pair of line wires L1 and L2 and a grounded neutral conductor N. The Broil element 10 is connected between L1 and L2 through a thermal relay generally designated 14 having a heater element 16 and a bimetal switch 18, 20 and a bidirectional current conducting device or triac 22 such as the Q4015 15 amp, 400 volt rated device available from Electronic Control Corporation. The Bake heating element 12 is similarly connected across L1 and L2 through the relay 14 and a triac 24 identical to the triac 22. Each of the power triacs 22 and 24 have their high terminal T2 connected with the elements 10 and 12 respectively while their reference terminal T1 is connected with the line L2. The gate terminals 26 and 28 of the triacs 22 and 24 are connected with the neutral line N through firing circuits generally designated 30 and 32 respectively. Each of the firing circuits 30 and 32 include a 0.022 microfarad capacitor 34, 36, and a 1,200 ohm one-half watt resistor 38, 40 and a pilot triac 42, 44. The heater element of the relay 14 is connected between line L1 and neutral through a tric 46. The triacs 42, 44, and 46 are the L4000K7 1.6 amp, 400 volt rated devices available from Electronic Control Corporation.

The control circuit for firing the pilot triacs 42, 44, and 46 is generally designated 48. The control circuit 48 is connected between the line L2 and the neutral conductor N and includes a zero crossover detector for providing an indication of when the AC supply reaches the zero crossover voltage point. The circuitry 48 further includes circuit means responsive to the zero crossover detector for providing a 30 microsecond wide 10 milliamp pulse 100 microseconds after the zero crossing of the AC supply to fire the pilot triac 42, 44, and 46. The control circuitry 48 further includes temperature sensing means which cooperate with the zero crossover detector so that the triggering pulses are applied to the gates of the triacs 42, 44 only when the temperature in the oven is below a preselected temperature. During the Broil operation the triac 42 is triggered at each zero crossing of the AC supply. During the Bake operation the triac 44 is triggered each zero crossing of the AC supply and in addition the triac 42 is triggered for two out of each eight zero crossings to provide 25 percent operation of the Broil element 10 on an integral cycle band.

Figure 2:
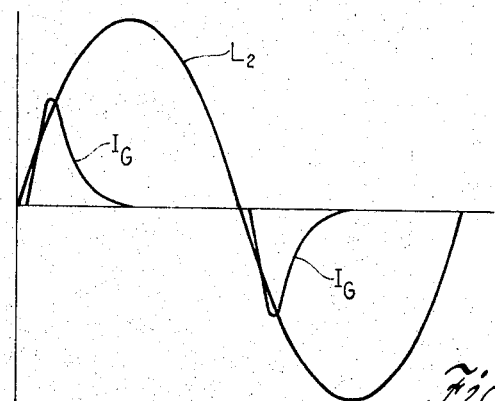
FIG. 2 are illustrative waveforms in the circuit of FIG. 1.

The operation of the trigger circuits 30 and 32 are identical and will be described with reference to the trigger circuit 30 and the waveforms shown in FIG. 2, assuming that the capacitor 34 is initially in a discharged state. The pilot triac 42 is triggered approximately 100 microseconds after the zero crossover point of the AC supply when the line voltage is approximately 7 volts. The short delay is provided so that there is enough power supply voltage available to provide the holding current necessary for the pilot triac 42. When the triac 42 is fired the capacitor 34 is charged through the resistor 38. As the line voltage reaches its peak value the charging current $I_G$ drops to zero and the pilot triac 42 turns off. As the line voltage drops toward the next zero crossover point the pilot triac 42 being in a nonconductive state holds the charge on the capacitor 34. 100 microseconds after the AC power supply reaches the zero crossover point the pilot triac 42 is again fired and causes the capacitor 34 to discharge to provide a firing current through the gate 26 of the power triac 22. In the $I_G$ waveform the peak position is extended on the time coordinate for illustrative purposes. The peak current of approximately 140 milliamps actually occurs shortly after the pilot triac is triggered as determined by the stray inductance of the circuit. As the line voltage proceeds on with its negative excursion the capacitor 34 is completely discharged and proceeds to charge in the opposite direction. As the power supply voltage reaches the peak negative excursion the charging current in the capacitor drops off to zero and the pilot triac 42 again turns off and holds the charge on the capacitor 34. As the power supply voltage again passes the zero crossover point from the negative direction the stored charge in the capacitor 34 is released upon firing of the pilot triac 42 to trigger to the power triac 22 thereby providing full wave current to the Broil element 10.

During the Bake mode of operation the Bake heating element 12 is energized in the same fashion as previously described with regards to the Broil element 10. In addition the Broil element 10 is energized 25 percent of the time by providing triggering of the pilot triac 42 on two out of eight zero crossings of the AC power supply as will be explained in detail in connection with the description of the circuit of FIG. 3.

Figure 3:
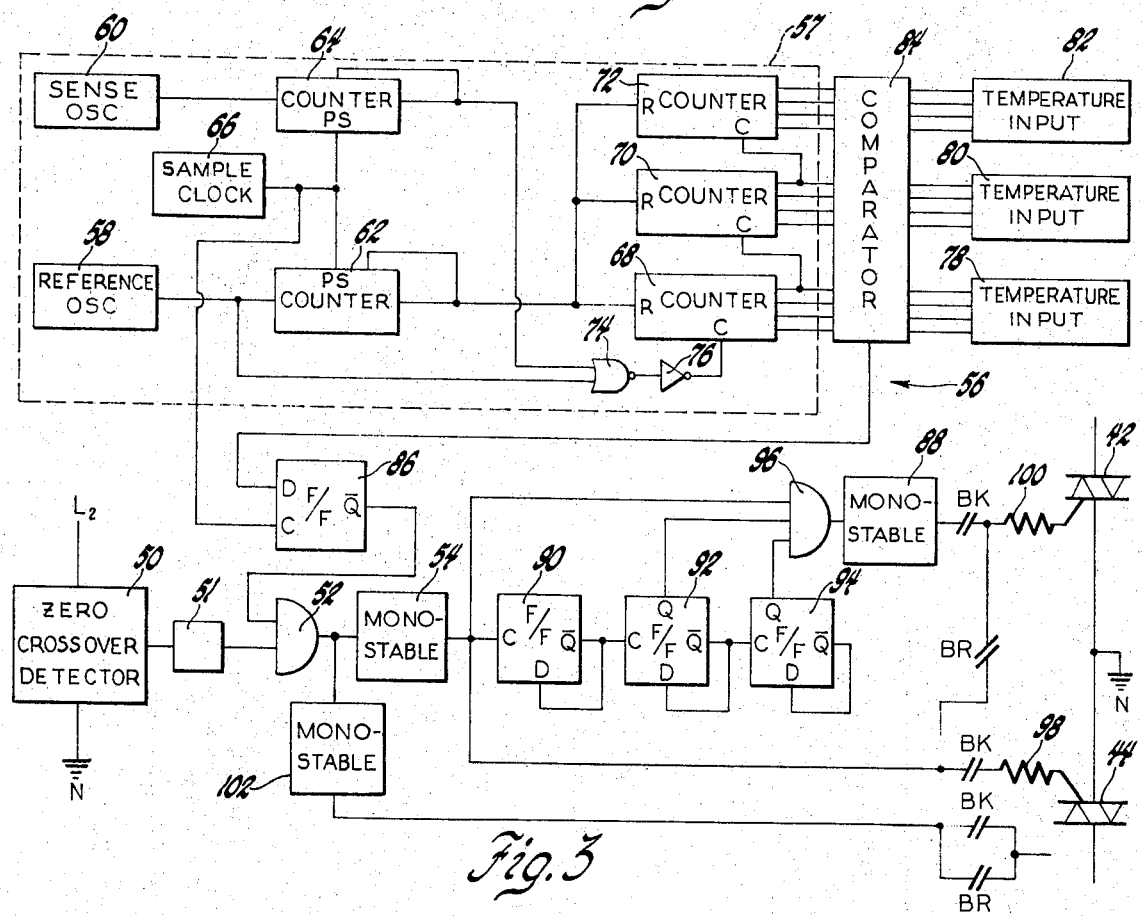
FIG. 3 is a more detailed block diagram of the circuit for controlling the gating of the pilot triac in the power triac firing circuit of FIG. 1.

Referring now to FIG. 3 the control circuitry 48 includes a zero crossover detector 50 connected between the line L2 and the grounded neutral wire N of the power supply. The detector 50 is a conventional device such as the Fairchild A 742 and provides a series of pulses synchronized with the zero crossover voltage point of the AC supply connected thereto. The output of the detector 50 is delayed, for example, by 100 microseconds by a delay network 51 such as a retriggerable one-shot and provides one input to an AND gate 52 which controls a retriggerable monostable multivibrator or one-shot 54. The one-shot 54 determines the width of the pulse applied to the gate of the pilot triacs 42 and 44. A minimum pulse width of 30 microseconds is provided by the one-shot 54. The other input to the AND gate 52 is from a temperature setting and control circuit generally designated 56. The circuit 56 comprises a temperature sensing A/D converter 57 including a reference oscillator 58 and a sense oscillator 60. The reference oscillator 58 is a conventional oscillator the output frequency of which is determined by its internal RC network. The sense oscillator 60 is a conventional oscillator having an internal RC network where the capacitor is of the same value as that of the reference oscillator but the resistor is temperature sensitive and has a positive temperature coefficient of resistance so that as the oven temperature increases the frequency of the sense oscillator 60 decreases. The pulsating output of the oscillators 58 and 60 are applied to respective counters 62 and 64. The counters 62 and 64 are controlled by a sample clock 66 producing a square wave output of substantially lower frequency than the output frequencies of either the reference oscillator 58 or the sense oscillator 60. When the output of the clock 66 is low the counters 62 and 64 are preset so that their outputs are low. When the clock 66 goes high the counters 62 and 64 accumulate the output pulses of the oscillators 58 and 60 respectively and upon reaching a terminal count are disabled so that no further counting occurs until the clock 66 returns to its high state after presetting the counters 62 and 64. The output of the counter 62 is applied to the reset terminal of decade counters 68 and 70 and 72. The counters 68, 70, and 72 provide at their output the BCD equivalent of the units, tens, and hundreds digits respectively of the actual temperature of the oven as represented by the difference in frequency between the two oscillators 58 and 60. The counter 68 is clocked from the reference oscillator through a NOR gate 74 and inverter 76. The NOR gate 74 is controlled by the output of the counter 64 which remains low until the counter 64 reaches its terminal count. The decade counter 70 is clocked from the counter 68 on the tenth clock pulse to the decade counter 68, and similarly, the decade counter 72 is clocked from the decade counter 70 on the tenth clock pulse to the decade counter 70. The counters 68, 70, and 72 are released to commence counting when the counter 62 reaches its terminal count and continue counting until the counter 64 reaches its terminal count at which time the gate 74 is disabled. The analog-to-digital converter 57 thus provides a digital indication of the analog temperature of the oven.

Temperature input elements 78, 80, and 82 which may be conventional BCD thumb wheel switches, are provided for setting respectively the units, tens, and hundreds digits of the desired oven operating temperature. The BCD outputs of the switches 78–82 and the decade counters 68–72 are compared in a comparator 84 which provide a control output which switches from a logic "1" to a logic "0" whenever the actual temperature of the oven as represented by the counters 68–72 is less than the desired oven temperature as represented by the output of the switches 78–82. The output of the comparator 84 is connected with the D input of a flip-flop 86, the $\overline{Q}$ output of which provides the second input to the AND gate 52. Whenever the temperature of the oven is less than the desired temperature, the $\overline{Q}$ output of the flip-flop 86 will be high and the monostable multivibrator 54 will be triggered through the 100 microsecond delay network 51 by each of the output pulses of the detector 50. The output of the multivibrator 54 enables a second monostable multivibrator 88. The multivibrator 88 is enabled for only two of eight output pulses of the detector 50 under the control of a ripple counter comprising flip-flops 90, 92, and 94 and an AND gate 96. The inputs to the gate 96 are from the multivibrator 54 and the Q outputs of the flip-flops 92 and 94. The multivibrator 88 is triggered from the multivibrator 54 but is disabled by the logic 0 input to the gate 96 from the flip-flops 92 and/or 94, after the first two of each eight output pulses of the multivibrator 54.

The selection of the Bake or Broil operation may be accomplished by a selector switch having contacts designated BK and BR. During the Bake operation the contacts BK of the switch are closed so that the output of the multivibrator 54 is applied to the gate terminal of the pilot triac 44 through a resistor 98 and the output of the multivibrator 88 is applied to the gate terminal of the pilot triac 42 through a resistor 100. Accordingly, continuous power is supplied to the Bake element 12 and 25 percent of the power is applied to the Broil element 10. During the Broil operation the contacts BR of the switch are closed and the contact BK are opened so that the Broil element 10 is energized at each 0 crossing of the AC supply as long as the temperature of the oven is below the set temperature. The triac 46 is triggered from a multivibrator 102 during either the Bake or Broil operation to apply power to the heater 16 of the thermal relay 14 to close the contacts 18, 20 when either the Bake or Broil operation is initiated.

Having thus described my invention what I claim is:

1. A circuit for controlling the current flow through a load from an A.C. voltage source having first and second line terminals and a grounded neutral terminal comprising;
    first and second gate controlled bilateral semiconductor switch means having first and second load terminals and a control gate terminal;
    means connecting the load terminals of said first switch means in series with said load between said first and second line terminals of said source;
    a series resistance capacitance network connecting the gate terminal of said first switch means to said first load terminal of said second switch means, means connecting said second load terminal of said second switch means to said neutral terminal of said source;
    neutral referenced control circuit means for developing a series of output trigger pulses synchronized with the zero crossover voltage point of said source; and
    means applying the output of the control circuit means to the gate terminal of said second switch means.

2. A circuit for controlling the supply of an alternating current voltage source to an electric oven, said circuit comprising:
    an oven heating element, a first triac connected in series with said heating element and having a reference terminal connected to a first line terminal of said source and its other load terminal connected with said heating element, means connecting the other side of said heating element to the second line terminal of said source;
    a second triac and an RC circuit connected in series between the gate terminal of said first triac and the neutral terminal of said source;
    control circuit means including a zero crossover detector connected between one-line terminal of said source and the neutral terminal of said source for providing a series of pulses synchronized with a zero crossover voltage point of said source, means for setting a desired temperature in said oven, means for sensing the temperature of said oven, and means responsive to the output of said zero crossover detector for triggering said second triac a predetermined time interval subsequent to the zero crossover point of said source whenever the temperature of said oven is below the set temperature.

* * * * *